Figure 1:
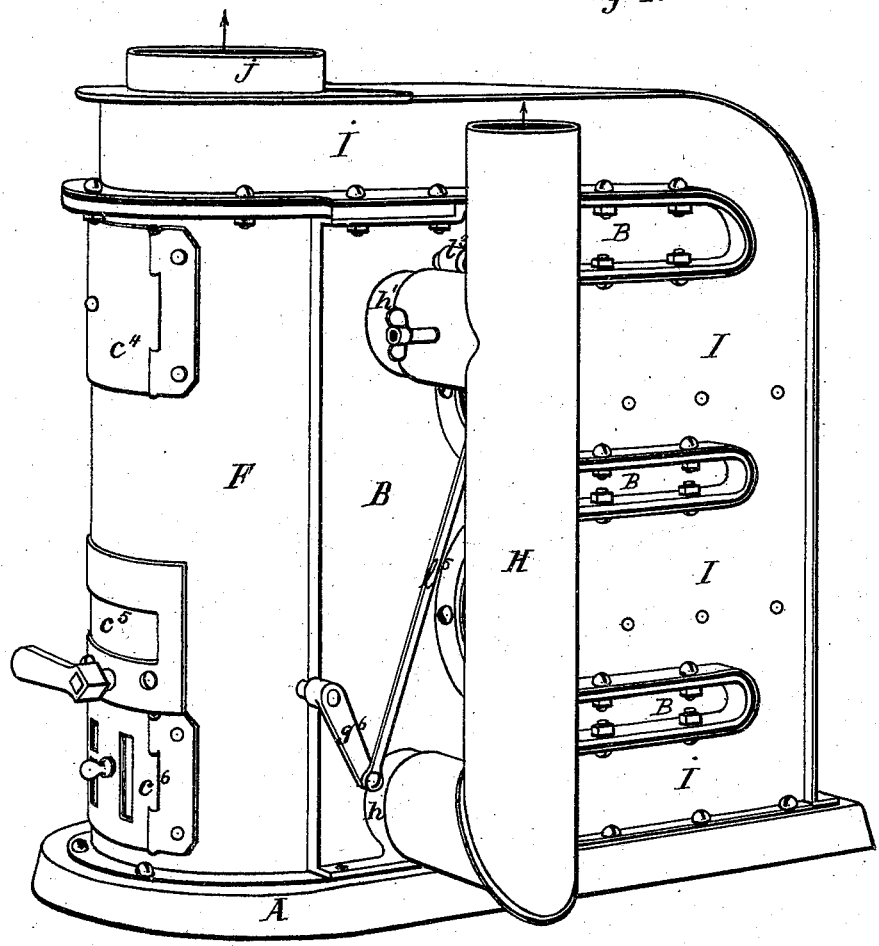

R. EICKEMEYER.
AIR-HEATING FURNACE.

No. 173,923.

5 Sheets—Sheet 1.

Patented Feb. 22, 1876.

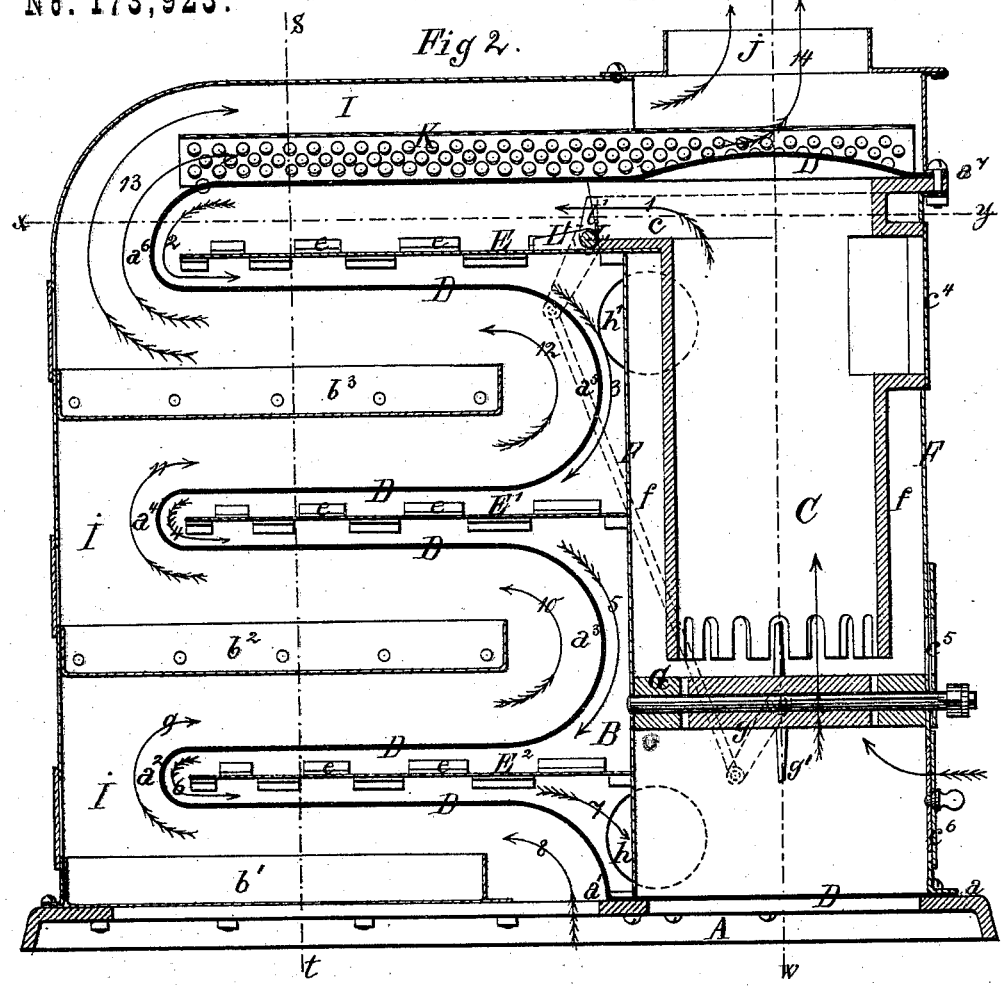
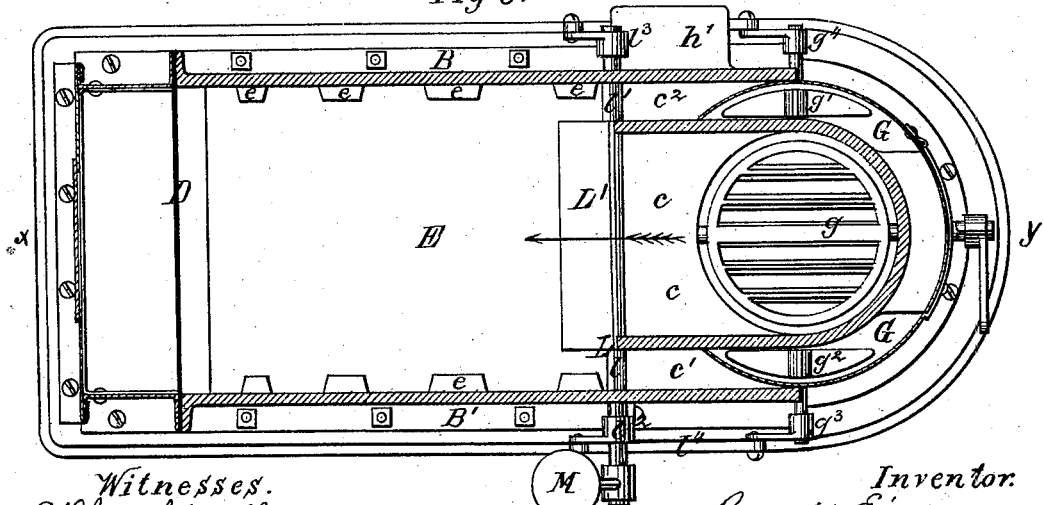

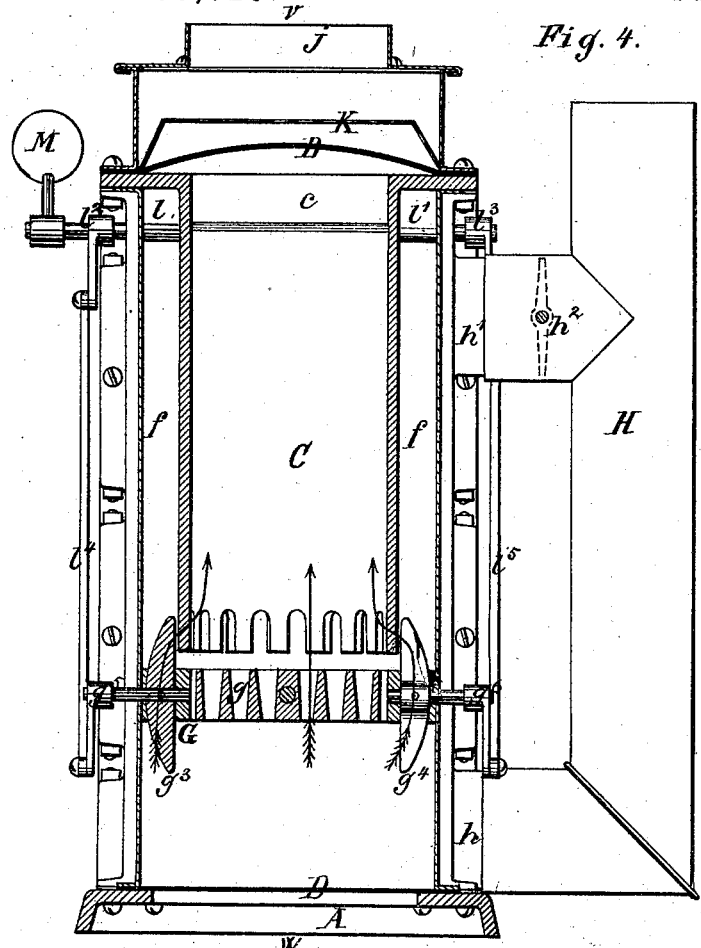
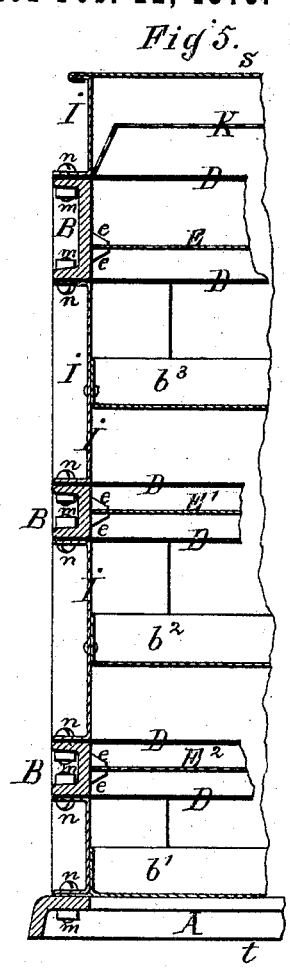
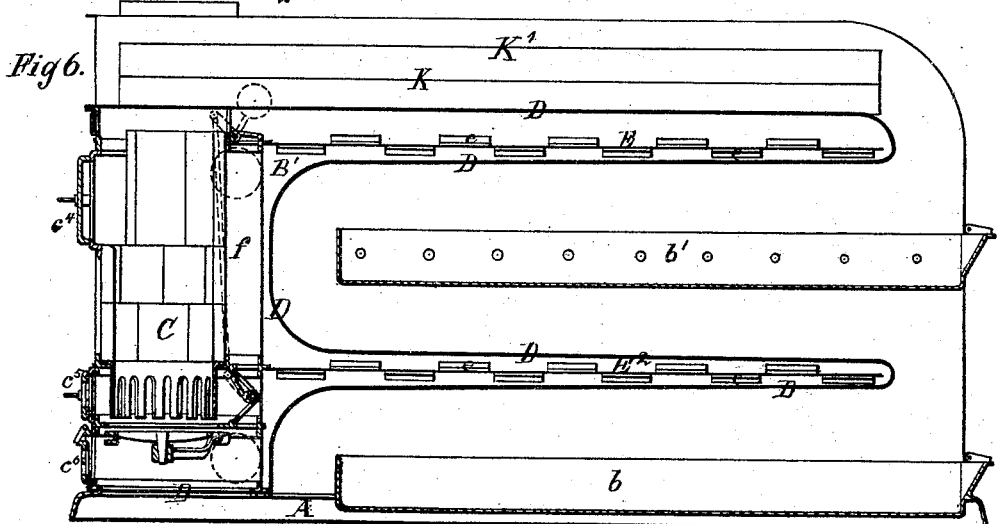

5 Sheets—Sheet 4.

R. EICKEMEYER.
AIR-HEATING FURNACE.

No. 173,923. Patented Feb. 22, 1876.

Witnesses
A. B. Cauldwell
Philip F. Larner

Inventor:
Rudolf Eickemeyer
By Wm. C. Mora
Atty.

5 Sheets—Sheet 5.

R. EICKEMEYER.
AIR-HEATING FURNACE.

No. 173,923.  Patented Feb. 22, 1876.

Witnesses.
A. B. Cauldwell
Philip F. Larner

Inventor
Rudolf Eickemeyer

UNITED STATES PATENT OFFICE.

RUDOLF EICKEMEYER, OF YONKERS, NEW YORK.

IMPROVEMENT IN AIR-HEATING FURNACES.

Specification forming part of Letters Patent No. 173,923, dated February 22, 1876; application filed December 8, 1875.

*To all whom it may concern:*

Be it known that I, RUDOLF EICKEMEYER, of the city of Yonkers, in the county of Westchester and State of New York, have invented certain new and useful Improvements in Air-Heating Furnaces; and I do hereby declare that the following specification, taken in connection with the drawings furnished and forming a part of the same, is a clear, true, and complete description thereof.

My invention more particularly relates to that class of air-heating furnaces in which a quantity of air is heated to a desired degree while passing over the heated walls of the fire-pot and passages, through which the products of combustion are conducted on their way to the smoke-pipe and chimney.

All of my improvements are applicable to furnaces built of brick, as well as to the so-called portable furnaces or heating-stoves, while that part of my invention which relates to the grates is equally well adapted to cooking stoves and ranges.

In the various kinds of furnaces heretofore constructed many difficulties have been experienced in keeping the heated air entirely free from the noxious gases incident to combustion, owing to the presence of joints in the combustion-chamber and in the air-passages, which, by reason of the unequal contraction and expansion of the parts, would open, and allow the gases to intermingle with, and thus vitiate, the heated air.

To get an efficient radiating-surface in a small space is another great difficulty. Many attempts have been made to increase the radiating-surfaces by adding pipes in various shapes and forms. These methods of construction, however, involve a number of joints so numerous, and increase the risks of leakage so much, that lately the best makers have abandoned most of these methods, and have adopted plain dome-topped cylinders of wrought-iron for combustion-chambers, and have thereby reduced the number of joints, but also materially lessened the practical value of the heaters in point of economy in the use of fuel.

The object of my invention is the production of a furnace which, while combining the most economical use of fuel with the largest desirable heating-surface, possesses a perfect security against any leakage of the gaseous products of combustion into the air-passages. To accomplish this object I have so constructed the fire-pot of the furnace that, by the turning of a lever, the furnace may be instantly converted from a surface-burner into a base-burner or magazine-stove, or vice versa, whereby I am enabled to vary the grate-surface to meet practical requirements. For instance, when less hot air is required for heating purposes, I can reduce the surface of the grate one-half; when the heat is to be diminished in the ordinary surface-burning heater or stove, the draft is decreased and the supply of air to the burning fuel partially shut off. This has the effect of producing carbonic oxide instead of carbonic acid, (at a cost of double the fuel,) and the further disadvantage that the reduction of the draft up the chimney will allow this most poisonous gas to pass through the smallest leak or opening into the air-passages, in which the draft is not diminished.

In my furnace I have an extensive grate-surface, and can either employ the whole, or, at will, reduce it to one-half its normal capacity for supplying air to the burning fuel, and while in the one case less fuel is burned than in the other, an equally perfect combustion is attained under both conditions of adjustment.

To transfer the heat contained in the products of combustion to the air in the air-passages, I have constructed a radiating-surface, consisting of a continuous sheet of wrought-iron properly secured to two cast iron frames, or, in lieu thereof, in brick-work. This continuous sheet is shaped in such a manner that the heated gases pass in their passage to the chimney-flue on one side of this sheet, while the air to which the heat is to be transferred passes on the other side of the same sheet, but in the opposite direction in which the hot gases move, thus bringing cold air in contact with the radiating-sheet at a point where the gases pass into the flue, thereby securing the largest possible difference between the temperature of the flue containing the heat and the air to which it is to be transferred. The hot gases move in one direction and the air in the opposite direction, and therefore the air, as it moves along, comes in contact with portions of the radiating-sheet of continually-increasing temperature, until it leaves the furnace at a point which is right over the fire in the fire-pot. The joints of the radiating-sheet are all on the outside of the framing or brick-work, as the case may be, and the air-passage is formed of sheet metal or built of brick-work, and is on the opposite side of the radiating-sheet. When the air-passages are made of sheet metal, the metal is flanged and fastened to the radiating or heating sheet with the same bolts which secure the radiating-sheets to the frame. As long as the radiating-sheet remains unbroken no gas can possibly escape from the fire-flue into the air-passages.

In order to furnish extensive heating-surfaces for the air, I have provided within the air-chamber, adjacent to the exterior surfaces of the radiating-sheet, certain auxiliary radiating-sheets, with both sides of which the air-currents are in contact as they pass through the chamber. I have also provided my furnace with a number of troughs for containing water, which, while serving as partitions in the air-passage for controlling and directing the air, and keeping it in contact with the radiating-sheet, also impart to the heated air a proper degree of moisture, thereby restoring to the atmosphere its required humidity.

To more particularly describe my invention I will refer to the five sheets of drawings, in which—

Figure 8:
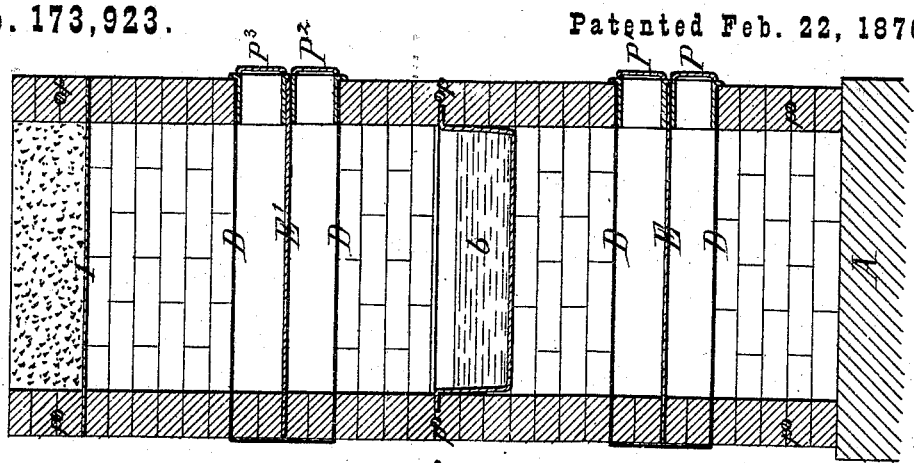
Figure 4:
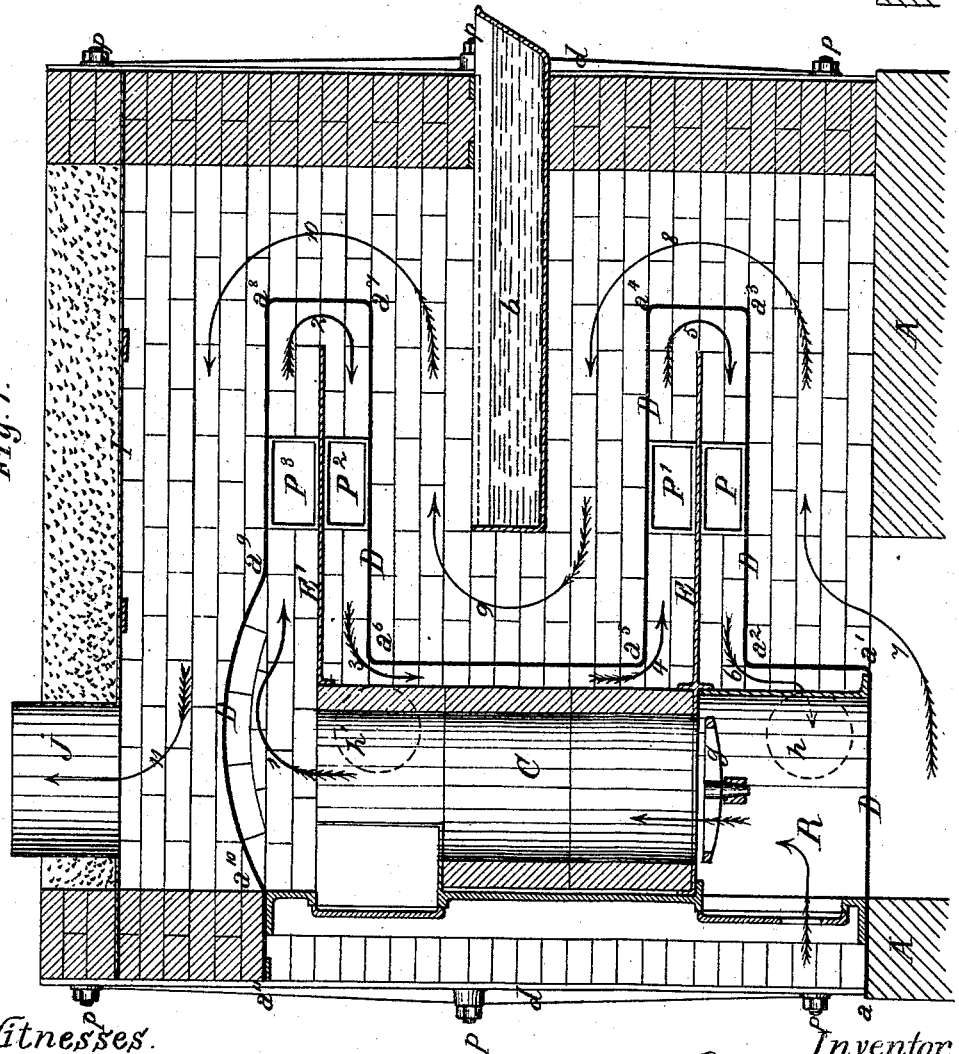
Figure 9:
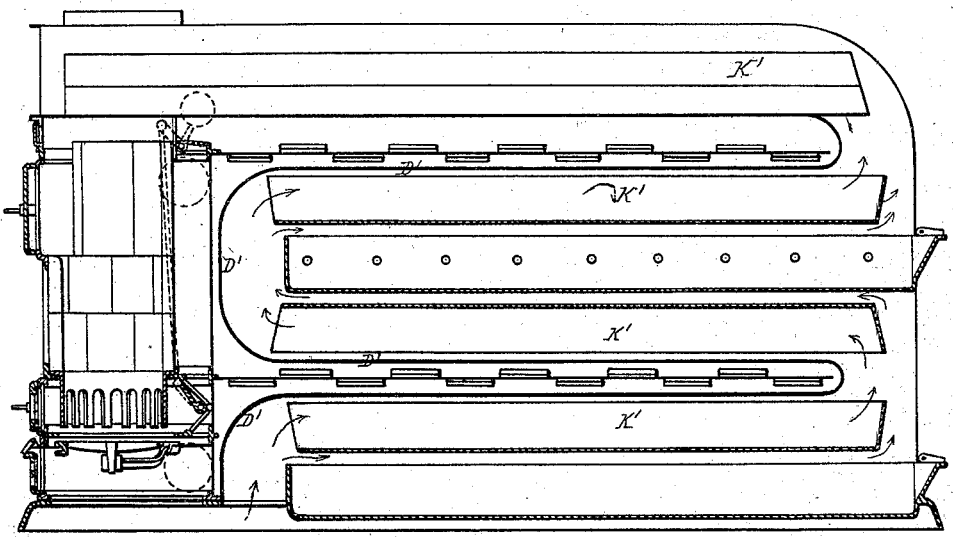
Figure 10:
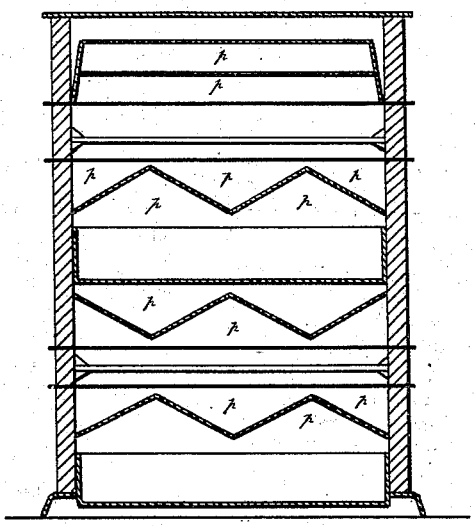

Figure 1, Sheet 1, is a perspective view of the heater. Fig. 2, Sheet 2, is a longitudinal vertical section through the center of the fire-pot and the furnace. Fig. 3, Sheet 2, is a horizontal sectional view through the line $x\,y$, Fig. 2. Fig. 4, Sheet 3, is a vertical section through the center of the fire-pot, in the direction of the line $v\,w$, Fig. 2. Fig. 5, Sheet 3, is also a vertical section on the line $s\,t$, Fig. 2, while Fig. 6, Sheet 3, is a longitudinal vertical section through the middle of the heater, shown in a somewhat modified form. Fig. 7, Sheet 4, is a longitudinal vertical section through the middle of a surface-burning furnace built of brick; and Fig. 8, Sheet 4, is a vertical cross-section of the same. Figs. 9 and 10, Sheet 5, represent the furnace, Fig. 6, when provided fully with auxiliary heating-sheets.

Similar letters refer to similar parts in Figs. 1, 2, 3, 4, and 5.

A is the bed-plate, upon which the whole structure is erected. B and B' are two cast-iron frames bolted upon the bed-plate, which support the fire-pot and the radiating-sheet, and form the sides of the passages and the outlets to the smoke-pipe for the volatile products of combustion. The fire-pot at C is cast in one piece, and rests with its upper flange on the frame-plates B B'. There are three flue-passages, as at $c$, $c^1$, and $c^2$, at the rear of the furnace, while in front it is provided with a feeding-door, $c^4$. The flue-passage $c$ communicates directly with the interior of the fire-pot, and the passages $c^1$ and $c^2$ communicate with the annular space or chamber which contains the fire-pot. The lower edge of this fire-pot is comb-shaped, forming an annular vertical grate of about the same superficial area as the central opening of the fire-pot. D denotes the radiating or heating sheet. It is made of ordinary sheet-iron of suitable thickness. The sheet is of sufficient length to reach from the base-plate A, as at $a$, under the ash-pit, forming the bottom of the same, to $a^1$; from thence, with a number of bends and folds backward and forward, it extends upward, as at $a^1$, $a^2$, $a^3$, $a^4$, $a^5$, $a^6$, to $a^7$, at the front and over the fire-pot. This sheet also extends laterally from outside to outside of the frame, which incloses the fire-pot, ash-pit, and heating-flue on three sides. This sheet may be made of varying thickness, different sheets riveted together, or otherwise permanently secured to each other, so as to form, practically, one continuous sheet of metal. Sheets of sufficient length for furnaces of ordinary size may readily be procured. When a joint is requisite in furnaces requiring a greater length, it can be rendered gas-tight by means of hot-riveting.

E, $E^1$ and $E^2$ denote lateral plates, composed of sheets of metal, which are held in place by short projections formed on the inside of the frame-plates B and B'. These sheets extend to the center of the curve formed by the bends and folds of plate D, and are fitted closely around the rear of the sheet-iron cylinder F, which is made of sheet metal, and constitutes a chamber, which contains the fire-pot. These lateral plates or partitions divide the space between the bends of the radiating-sheet into two passages, which are connected at their outer ends. The upper and lower ends of the cylinder F are provided with flanges, bolted to the flange of the fire-pot and the bed-plate, respectively, and it is held between the frames B and B'. The feeding-door $c^4$, the mica door $c^5$, and the ash-pit doors $c^6$ are framed in this cylinder. G denotes a ring, fastened in the cylinder F a little below the lower edge of the fire-pot C. In the center it has an opening, in which the horizontal circular grate $g$ (of about the size of the inner diameter of the fire-pot) is pivoted, and on each side it has oblong apertures $g^1$ and $g^2$, which can be opened or closed by the dampers $g^3\,g^4$. H denotes the smoke-pipe, which communicates with lower and upper openings, $h$ and $h'$, in the frame B. To facilitate the kindling of a fire in the furnace, it is necessary to allow the discharge of gases as quickly as possible, and for this purpose the upper opening $h'$ is provided. An ordinary damper (shown in dotted lines in Fig. 4) is placed in the smoke-pipe near opening $h'$; when open, this will allow the smoke to escape into the chimney after it has passed one fold only, while it would have to travel the whole length of the heating-flues if discharged at the opening $h$, as would be the case if this damper were closed. I denotes an outer casing, made of sheet metal, which is fitted into the spaces between the folds of the radiating-sheet and to the frame, and, with the vessels $b^1 b^2$ and $b^3$, it forms the passage for the air. K denotes one form of auxiliary radiating-sheet; it is composed of a sheet of metal, which is perforated to allow free circulation of the air. This perforated sheet is heated by direct radiation from the plate D, and furnishes an additional heating-surface, for heating the air as it passes along and through it. L denotes a damper placed in the outlet of the fire-pot; it has one main lip at L′, large enough to close the direct outlet $c$, and two smaller lips, $l$ and $l^1$, (which are set at about right angles to lip L′,) which control the small side openings $c^1$ and $c^2$. The shaft of the damper passes through openings in the frame, and has on its outer end a weighted lever, M, by means of which the damper may be turned on its axis, and by the weight held in either position. Two short levers, $l^2$ and $l^3$, are also fastened to the same shaft, and are connected, by links $l^4$ and $l^5$, with levers $g^5$ and $g^6$.

The levers $g^5$ and $g^6$ are fastened to the spindles of the dampers $g^3$ and $g^4$, and serve to open or close the openings $g^1$ and $g^2$, by means of the main lever M. As shown in the drawings, the passage $c$ is open, while $c^1$ and $c^2$ are closed, and the holes $g^1$ and $g^2$ in the ring G are open. When the fire is kindled in the fire-pot the air will enter the ash-pit through openings in the ash-pit door, which is provided with a slide, in the usual manner, to regulate the quantity of air necessary for the requisite combustion of the fuel in the fire-pot. A part of the air passes upward through the horizontal grate $g$ to the fuel, while another part passes through the openings $g^1$ and $g^2$, and enters the fire-pot laterally through the vertical circular grate on the lower end of the fire-pot. The products of combustion, when leaving the fuel, following the direction of the arrows 1, 2, 3, 4, 5, 6, and 7, pass back and forth under and above the radiating-sheet until they reach the outlet $h$ and enter the smoke-pipe. The cold air, in the meantime, enters from under the bed-plate, and, following the direction of the arrows 8, 9, 10, 11, 12, 13, and 14, passes over the water in $b^1$, under the radiating-sheet, then turns under the water-trough $b^2$ and over the radiating-sheet, and so on, until it passes out at the opening J above the center of the fire-pot. It will be seen that the troughs, whether supplied with water or not, perform an important service as partitions in the air-chamber, which direct the air in its passage through the chamber against the radiating-surface of the heating-flue. It is obvious that the air must receive a very large proportion of the heat produced by the combustion of the fuel. During its passage upward the current of air is broken at each turn, and the cold and warm air continually mixed. I have found, in practice, that a volume of air which entered the furnace at 60° Fahrenheit left it at 230° Fahrenheit, while the gases and other unconsumed products of combustion passed into the smoke-pipe at a temperature of from 85° to 150°, showing conclusively that when properly proportioned the heat not required for inducing draft in the chimney can be transferred to the air in its passage along the opposite side of the radiating-sheet, in the manner shown. The troughs, when supplied with water, will furnish the passing air with whatever quantity of moisture it may be able to take up at the temperature attained at each point. The casing I is provided with openings closed by doors, to allow free access for filling and cleaning the troughs whenever occasion requires.

I have so far considered the furnace as a surface-burner, and I will now describe its operation as a base-burner.

The weighted lever M is shown in the drawings inclined backward at about an angle of forty-five degrees. When in this position the wings $l$ and $l^1$ of damper L shut up the passages $c^1$ and $c^2$, leaving the passage at $c$ open, while the dampers $g^3$ and $g^4$ stand in a vertical position, allowing the air to pass, through the openings $g^1$ and $g^2$ in the ring G, into the annular space $f$, which surrounds the fire-pot.

To convert the furnace into a base-burner it is only necessary to throw the lever M forward; this causes the shaft of the damper L to make a quarter-turn, and brings the large lip or wing L′ into a vertical position, closing the opening $c$, while the two lips or wings $l$ and $l^1$ are laid down, thereby opening the passages $c^1$ and $c^2$, which connect with the annular space $f$. By means of levers $l^2$ and $l^3$, the links $l^4$ and $l^5$, and the levers $g^5$ and $g^6$, the dampers $g^3$ and $g^4$ also take a quarter-turn, and the openings $g^1$ and $g^2$ are closed. The air entering through the horizontal grate can now no longer pass upward through the fuel in the fire-pot, but must pass outward laterally through the vertical grate at the lower end of the fire-pot, and upward into the annular space $f$, from which it passes to the rear through the openings $c^1$ and $c^2$ under the radiating-sheet, as in the first instance. The vertical grate having thus been converted into an outward passage for the air, the heating capacity of the furnace is proportionally lessened.

During the night, or during mild weather, this is a very desirable feature, especially in a climate like ours, where the extremes of heat and cold follow each other in rapid succession.

Fig. 5 represents the manner in which the joints of the gas and air passages are made. A denotes a section of the bed-plate, and B a section of the frame. D denotes sections of the radiating or heating plate, which extends laterally from outside to outside of the frames. E, $E^1$, and $E^2$ denote sections of the partitions, held between the projections $e$, and $b^1$, $b^2$, and $b^3$ denote sections of the water-troughs, which form the partitions in the air-passage. K denotes a section of the perforated heating-plate. The sheet-metal casing at I is also shown in section, and the screw-bolts at $n$, with their nuts $m$, pass through the flanged part of the casing, through the radiating-plate D near its edge, and the flange of the frame B, thereby making a tight joint between the casing and the radiating-plate, and also between the radiating-plate and the frame.

Should any gas escape it would pass out between the frame and the heating-plate, and can in no manner mingle with the heated air, and, as all the joints are on the outside, any defect can be readily discovered and easily corrected.

In Fig. 6, Sheet 3, a furnace of somewhat different construction is represented in section. The fire-pot at C is lined with fire-brick, and the radiating-sheet at D is folded twice only. To give the requisite heating-surface I have so extended the sheet D as to secure correct proportion of the heating-surface to the capacity of the fire-pot. To further increase the heating-surface, two plates at K and K′, perforated as previously described, are placed in the upper portion of the air-passage. Two dampers only are used to change the furnace from a base-burner to a surface-burner, and cast-iron doors are substituted for those shown in the other views.

Fig. 7, Sheet 4, are vertical sections of a surface-burning furnace in its simplest form. The whole casing, with the exception of the front, with its two doors, is built of brick.

A denotes the foundation upon which the whole structure is erected. The opening in the foundation serves as an inlet for the cold air. D denotes the radiating or heating sheet, which, beginning at $a$, passes horizontally to $a^1$, thereby forming the bottom of the ash-pit, and from $a^1$ vertically to $a^2$, where it is bent again horizontally to $a^3$, thence vertically to $a^4$, thence to the rear, as at $a^5$, and so on as at $a^6$, $a^7$, $a^8$, $a^9$, $a^{10}$, and $a^{11}$.

Directly over the fire-pot the sheet D is arched to give it additional stiffness and prevent warping. The sheet D is built into and extends laterally through the brick-work, as in Fig. 8, and thus separates the part of the furnace which contains the fire-pot and heating-flues from that part of it which constitutes the air-passage. R denotes the ash-pit, by which the grate is supported. C denotes the fire-pot, lined with brick, and E and $E^1$ denote partition-plates built into the side walls. The fire-pot C rests upon the front portion of plate E, and the extended portion of this plate E serves as a partition, forming the heating-flue. The partition-plate $E^1$ forms the upper support of the fire-pot, and surrounds it at its upper end.

P, $P^1$, $P^2$, and $P^3$ denote hand-holes or doors constructed in the side walls to facilitate the cleaning of the heating-flues. $b$ denotes a water-trough, which serves also as a partition in the air-passage. I denotes a sheet of metal closing the top of the air-chamber, which is covered with sand or other suitable non-conducting material, and J denotes the outlet for the hot air.

The outlets shown in dotted lines at $h$ and $h'$ are for the passage of the volatile products of combustion to the smoke-pipe. The brick-work is bolted together by stay-bolts $p$ $p$ $p$, which are built into the side walls, and these, with the plates $d$, prevent the loosening of the joints when the radiating-sheet or the other plates, which are built into the side walls, are expanded by the heat or contracted in cooling.

The operation of this furnace is the same as in the other modification shown. The air enters the ash-pit through an opening in the door, passes through the grate $g$ to the fuel in the fire-pot C, and the volatile products of combustion pass up and follow the direction of the arrows 7, 8, 9, 10, and 11. The air is heated by the plate D, moistened in passing over the water in the trough $b$, and escapes through the outlet J.

In Figs. 9 and 10, the furnace shown in Fig. 6 is illustrated in connection with auxiliary radiating or heating sheets, extending practically throughout the length of the main radiating-sheet, instead of at one point only, as in Fig. 2, at K. In these figures, 9 and 10, the auxiliary radiating-sheets are shown at K′, and they are so constructed that the air passes on both sides of them throughout the length of each horizontal surface of the main radiating-sheet. In Fig. 10, the sectional view shows the auxiliary radiating-sheet to be so bent as to constitute passages, (shown at $p$.) The iron employed for making these auxiliary radiating-sheets will preferably be of rough finish, in order that it may readily take up the heat radiated from the main sheet, and give it off to the air by its contact therewith. The several arrows shown in Fig. 9 indicate the course of the air through the air-chamber, and it will be seen that the auxiliary heating-sheet K′ is so arranged with relation to the main radiating-sheet D′ that the former will be heated, and can operate, when but little air is allowed to escape from the chamber, as a heat-reservoir, from which heat will be freely yielded should the demand on the air-chamber be suddenly increased for heating additional rooms. It is, of course, possible to vary the form of these auxiliary sheets to an almost indefinite extent, and yet retain therein valuable operative capacities; but I prefer to make them so as to afford passages, substantially as illustrated in Figs. 9 and 10, as that form of construction is simple, inexpensive, and secures a desirable effect in cutting up the air-chamber into what may be properly termed numerous longitudinal compartments, within the heated walls of which the air may pass in a common direction, and be delivered at the same point for exit from the furnace. It will be seen that, when constructed as shown in Figs. 9 and 10, the auxiliary radiating-sheets K′ are not connected with each other, but are arranged so that air can readily pass between them and the main radiating-sheet, and permit both superficial surfaces of the latter to be in contact with the air as it passes through the air-chamber.

Having thus described my invention, I claim as new and desire to secure by these Letters Patent—

1. The combination, with a heating-flue in a hot-air furnace, a fire-pot, and a chamber containing the same, both of which have separate openings communicating with said heating-flue, of a horizontal grate, a vertical grate, and damper, which control the exit-openings of both the fire-pot and the inclosing-chamber, substantially as described, whereby the heat and the unconsumed products of combustion may be conducted into and through the heating-flue, either from the fire-pot or from the inclosing-chamber, as set forth.

2. The combination, with the dampers which control the passage of air to the vertical grate, and the central damper, which controls the exit-apertures of the fire-pot, and the damper of the chamber which contains the fire-pot, of a system of connecting-levers, substantially as described, whereby the several dampers may be simultaneously set, as set forth.

3. In an air-heating furnace, the combination, with the fire-pot and an air-chamber, of a radiating-flue, composed of a continuous radiating-sheet, bent or folded, and provided with plates or partitions, which form passages in the bends or folds, through which the products of combustion are directed to and fro throughout the length of the radiating-flue in their passage from the furnace, substantially as described.

4. The combination, in an air-heating furnace, of a fire-pot, a radiating-flue, composed of a bent or folded sheet of metal, and having an interior passage, which corresponds with the bends or folds, with an air-chamber, provided with troughs or directing-partitions, substantially as described, whereby the air in its passage through the chamber is well mixed, and made to traverse the entire heating-surface of the radiating-flue, as set forth.

5. The combination, with a heating-flue, in which the products of combustion travel from and toward the fire-pot in their passage from the furnace, of an air-chamber, in which the air travels to and fro in its passage through it, while in contact with the exterior of the heating-flue, and which is provided with a cold-air-induction passage adjacent to the exit-aperture of the heating-flue, and an exit-aperture for the hot air, located adjacent to the connection of the heating-flue with the fire-pot, substantially as described, whereby the air to be heated travels in contact with the entire radiating-surface of the heating-flue, and is conducted in a direction opposite to that in which the products of combustion pass from the fire-pot through the furnace, as set forth.

6. The combination, with a fire-pot and a radiating-flue, in which the products of combustion traverse to and fro in their passage from the furnace, of outlets or passages provided with dampers, communicating with the smoke-pipe or chimney, which are located at different points in the line of the flue, substantially as described, whereby the products of combustion may be made to traverse the entire length of the flue, or a lesser portion thereof, as set forth.

7. In an air-heating furnace, the combination, with the air-chamber, of a single continuous flue, having a radiating-surface, which is composed of a continuous bent or folded sheet of metal, which extends through the framing of the furnace, and is connected at the edges with that portion of the framing which constitutes the non-radiating surfaces of the flue, substantially as described, whereby gas escaping from the flue through its joints is discharged outside the air-chamber, as set forth.

8. The combination, with the air-chamber and the main radiating-sheet, of an auxiliary radiating-sheet located adjacent to the main sheet, for receiving heat radiated therefrom, and arranged to afford an air-passage along both surfaces of the auxiliary radiating-sheet throughout its length, substantially as described.

9. The combination, with a heating-flue, of a perforated heating-sheet, located in the hot-air chamber, adjacent to the radiating-surface of the heating-flue, substantially as described, whereby the air to be heated may pass along both surfaces of the heating-sheet, and through its perforations, as set forth.

10. In an air-heating furnace, the combination, with the air-chamber, of a heating-flue provided with radiating-surfaces, composed of a continuous sheet of metal, which is extended from the front of the furnace below the ash-pit to the rear, thence upward and back to the front of the furnace, above the fire-pot, substantially as described, whereby that portion of the furnace which contains the fuel and the unconsumed products of combustion is wholly separated from the air-chamber and its passages, an extensive radiating-surface afforded, and the escape of vitiating gases into said air-chamber prevented.

RUDOLF EICKEMEYER.

Witnesses:
W. SCHWANHAUSSER,
GEORGE NARR.